Dec. 23, 1930.  T. W. B. WATLING  1,785,849
WEIGHING SCALE
Original Filed May 28, 1928   2 Sheets-Sheet 1

Inventor:
Thomas W. B. Watling
By Fisher, Clapp, Soans & Pond Attys.

Dec. 23, 1930. T. W. B. WATLING 1,785,849
WEIGHING SCALE
Original Filed May 28, 1928  2 Sheets-Sheet 2
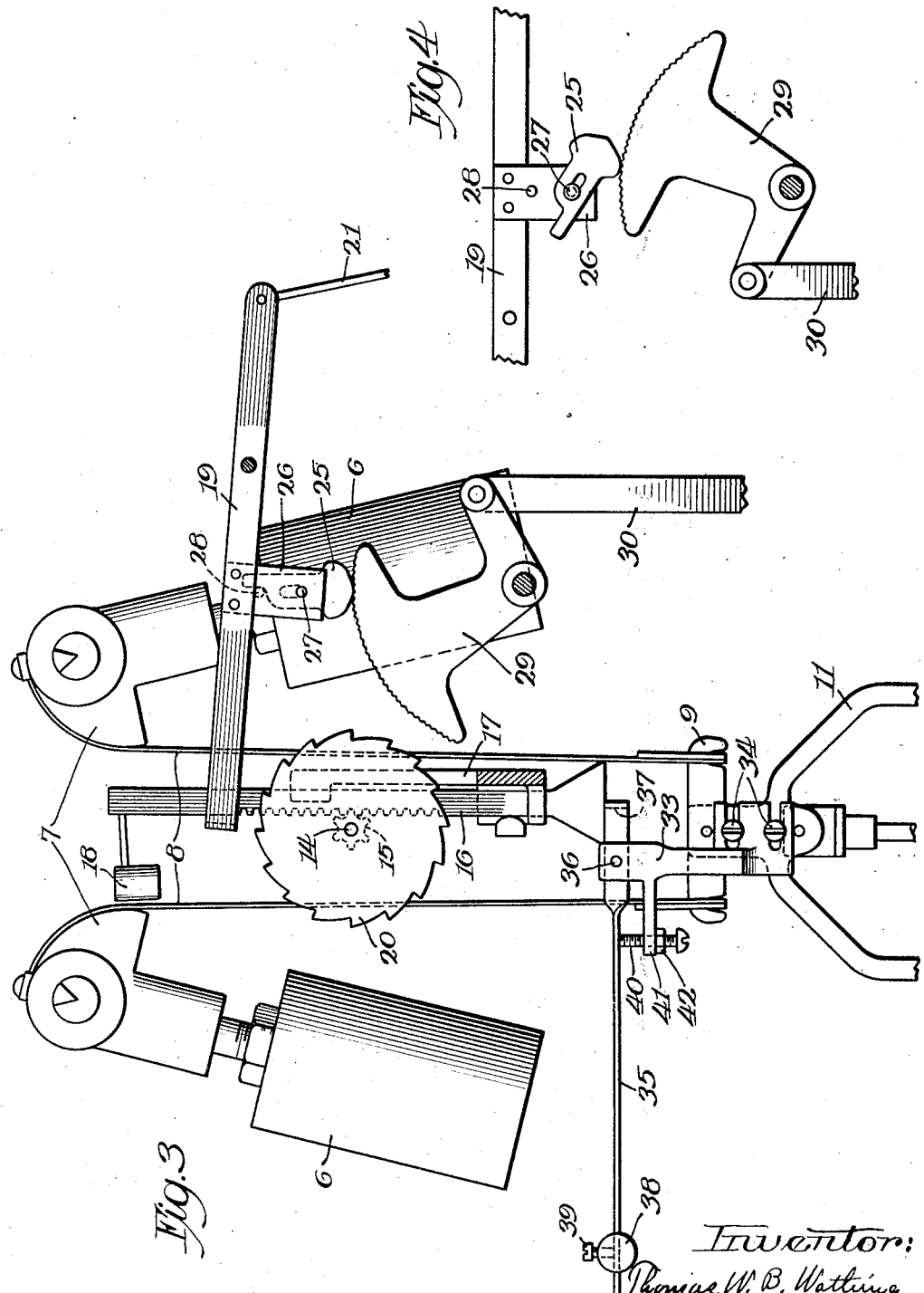

Patented Dec. 23, 1930

1,785,849

UNITED STATES PATENT OFFICE

THOMAS W. B. WATLING, OF CHICAGO, ILLINOIS

WEIGHING SCALE

Application filed May 28, 1928, Serial No. 281,016. Renewed January 20, 1930.

The invention relates to weighing scales and particularly such scales as are adapted to be coin-controlled and are provided with a releasable weight indicating mechanism and a weighing mechanism having a stop device for limiting the forward movement of the indicating mechanism and for restoring the same to normal position. The chief object of the invention is to provide the weighing mechanism with a counterbalanced stop device for arresting the forward movement of the indicator and which also preferably restores the indicator to its normal zero position without causing undue vibration of the indicator. The invention is hereinafter more fully set forth in detail, is illustrated in its preferred form in the accompanying drawings and more particularly pointed out in the appended claims.

In the drawings:

Fig. 3 is an enlarged detail in front elevation of the operating mechanism.

Fig. 4 is a further detail of parts shown in Fig. 3.

Figure 2:
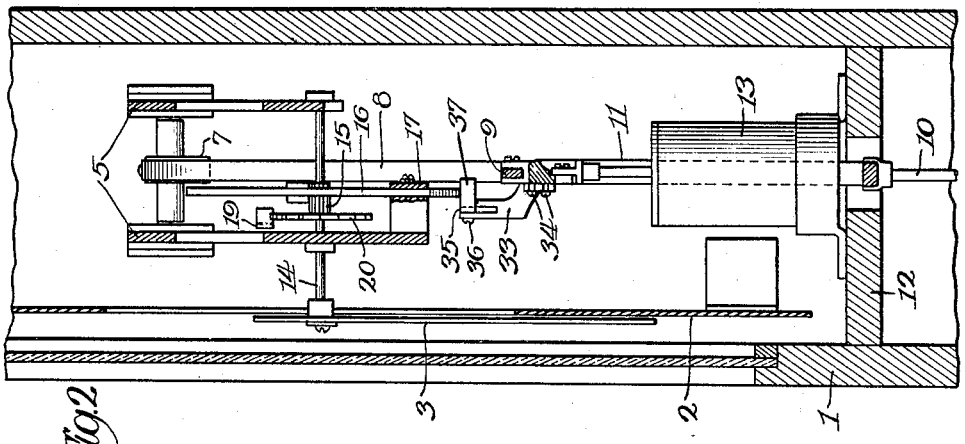
Fig. 2 is a vertical section on the line 2—2 of Fig. 1.

The weighing mechanism is enclosed in a suitable casing 1 having a glazed opening through which the dial 2 and rotatable indicator 3 are viewed. Within the casing and in rear of the dial is mounted a transverse supporting frame 5 on which are pivotally mounted a pair of weighted pendulums 6. The hubs of the pendulums are provided with cams 7 and straps 8 fixed to the pivoted ends of the pendulums extend over these cams. The lower ends of the straps are engaged by a cross bar 9 which is pivotally mounted upon the upper end of a weight actuated rod 10. The latter is connected at its lower end in a usual or suitable manner to the scale platform (not shown). Preferably, as shown, the upper end of the weight actuated rod is in the form of a yoke 11 which extends through an opening in a transverse support 12, and an oil cylinder 13 mounted on the support cooperates with the piston connected to the upper end of the yoke to cushion the movements of the weight actuated rod.

The indicator 3 is mounted upon the end of a shaft 14 mounted in the frame 5 and a pinion 15 on the shaft engages the teeth of a rack bar 16. The rack bar is weighted and is mounted to move vertically in a suitable guiding bracket 17 mounted on the frame 5. A weight 18 on the upper end of the rack bar tends to hold it in engagement with the pinion 15 and take up lost motion between the teeth of the rack and pinion.

The weight of the rack 16 tends to move the indicator 3 in forward direction, but the latter is normally locked in its zero position by a latch bar 19 pivoted between its ends on the frame 5 and having an offset inner end arranged to engage the teeth of a ratchet wheel 20 that is fixed to the shaft 14. Suitable means are provided for releasing the latch 19. In the form shown it is connected by a link 21 to an arm 22 and the latter is fixed to the pivot of a plate 23 which projects within a coin chute 24, so that the latch is released when a coin is dropped through the chute.

The latch bar 19 is provided with means for holding it in released position. For this purpose a dog 25 having a weighted lower end is pivotally connected to a depending lug 26 on the latch bar (see Figs. 3 and 4). A pivot pin 27 projecting from the lug extends through a vertical slot in the dog and a stop pin 28 on the lug is arranged to cooperate with the dog and limit its movement in one direction. The dog 25 also cooperates with a quadrant 29, the working face of which is knurled or provided with a series of shallow teeth. This quadrant is pivoted on a depending portion of the frame 5 and is connected by a link 30 to an arm 31 (see Fig. 1), and the latter is adjustably secured to a vertical pin 32 that is fixed to the side of the yoke 11 on the weight actuated rod 10.

A small bracket 33 is adjustably mounted on the upper end of the yoke 11 by means of screws 34 which extend through transverse or horizontal slots in the base of the bracket. A stop arm or lever 35 is connected by a pivot 36 to the upper end of the bracket 33. This stop arm is preferably formed of a thin metal bar which is twisted adjacent one end to provide a portion disposed in a vertical plane through which the pivot pin 36 extends and the extreme end of which is offset to form a lug 37 which extends beneath the lower triangular shaped end of the rack bar 16. A small counterweight 38 is adjustably held in position by a screw 39 on the opposite end of the stop arm or lever 35, and holds the arm in engagement with an adjusting screw 40 which is arranged below the stop arm and is threaded through a lug 41 on the bracket 33, a lock nut 42 being provided for holding the screw in adjusted position. The lug 37 on the stop arm is arranged closely adjacent its pivot so that the small counterweight 38 on its extended opposite end has considerable leverage to overcome the weight of the rack bar 16 when the latch lever 19 is released.

Figure 1:
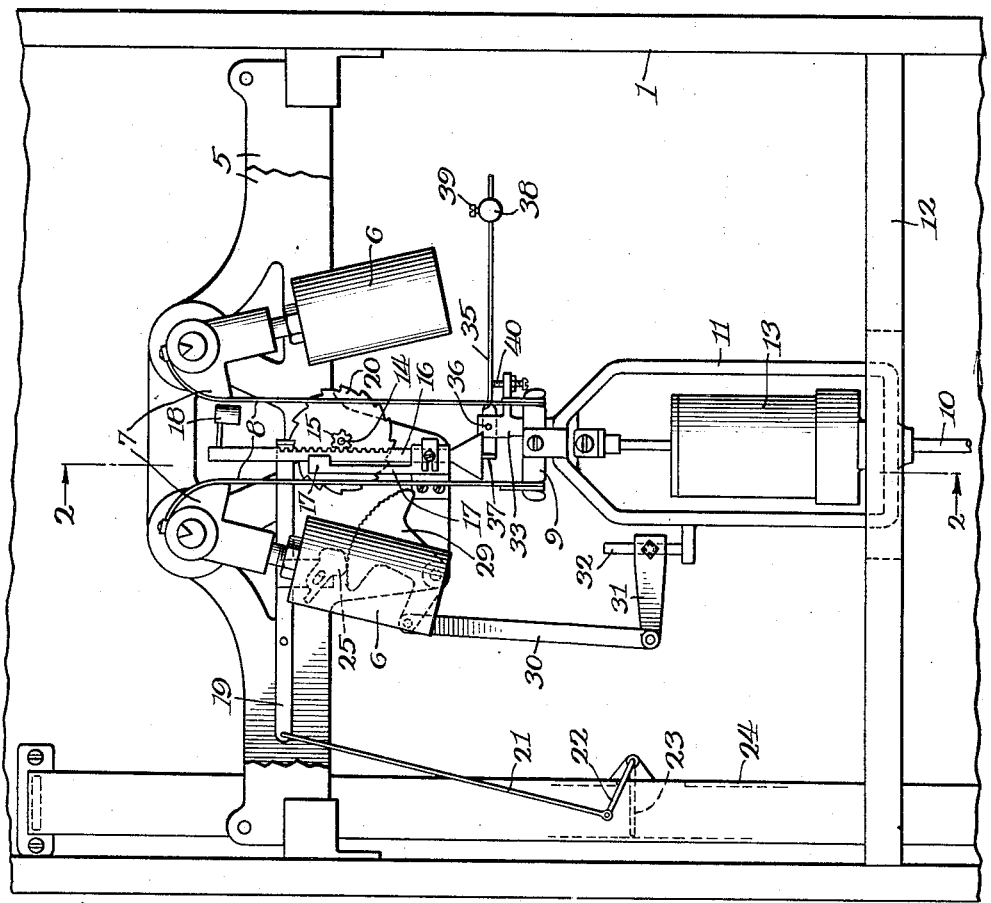
Fig. 1 is a view in rear elevation of the improved weighing and weight indicating mechanism, with parts of the supporting frame broken away.

The parts normally occupy the position shown in Fig. 1. When a weight is placed upon the scale platform, the actuating rod, yoke, and stop arm 35 are moved downwardly, but usually the indicating mechanism is held against forward movement by the latch lever 19. When the latter is released, the weighted dog 25 will swing into vertical position against the stop pin 28, as shown in Fig. 3, and it will then so rest on the segment 29 that the latch lever will be held in its released position. As soon as the latch lever is released the rack bar drops by gravity and rotates the indicator 3 in forward direction until the lower end of the rack engages the lug 37 on the stop arm 35. This counterweighted stop arm will serve to arrest the indicator and its actuating rack bar without shock and without causing excessive vibration of the indicator, so that the latter is quickly brought to position to indicate the weight on the platform.

As soon as the weight is removed from the platform or partly relieved, the teeth of the segment 29 will swing the dog 25, as shown in Fig. 4, and the latch 19 will re-engage the ratchet 20. However, the teeth of the ratchet wheel are so inclined that they do not prevent the return of the indicator hand to its normal zero position and this is effected, as the weight actuated rod moves upwardly, by the engagement of the lug 37 on the stop arm 35 with the lower end of the rack. The pivoted counterweighted stop arm 35 not only yields slightly to check and cushion the downward movement of the rack bar and the forward movement of the indicator, but it also cushions the return movement of these parts so that the indicator is quickly brought back to its normal zero position without undue vibration.

By means of the adjusting screws 34, the bracket 33 can be adjusted to bring the lug 37 on the stop arm immediately below the center of the rack bar 16. The desired leverage for the counterweight 38 is provided by adjusting it on the stop arm. By means of the adjusting screw 40, the normal position of the rack bar can be adjusted to hold the indicator accurately in its normal zero position. It is noted that the screw 40 acts as a stop device to hold the arm 35 in a substantially horizontal position. It is also noted that the stop means for yieldingly arresting the forward movement of the indicator as well as the arrest of the mechanism avoids the use of springs which are so affected by changes in temperature that they interefere with the accuracy of the weight indicating operations.

Changes may be made in the details set forth without departure from the scope of the appended claims.

I claim as my invention:

1. In a weighing scale, a vertically movable weight actuated rod, a weight indicator, a counterbalanced stop arm pivoted on said weight-actuated rod, and a vertically movable member connected to the indicator and engaging said stop arm to limit the forward movement of the indicator, substantially as described.

2. In a weighing scale, a vertically movable weight-actuated rod, a weight indicator, a vertically movable member connected to said indicator, a stop-arm pivoted on said rod and engaging said member to limit the forward movement of said indicator and restore it to normal zero position, an adjusting screw for said stop arm and a counterweight adjustable on said arm and normally holding it in engagement with said adjusting screw, substantially as described.

3. In a weighing scale, a vertically movable weight-actuated rod, a weight indicator, a vertically movable member connected to said indicator, a bracket laterally adjustable on said weight actuated rod, a stop arm pivoted on said bracket and having an offset lug extending beneath and engaging said member, an adjusting screw for said stop arm mounted on said bracket, and an adjustable counterbalance on said arm for holding it in engagement with said screw, substantially as described.

4. In a weighing scale, a weight indicator, a vertically movable actuating member therefor, a weight actuated rod, and a counterbalanced stop arm pivoted on said rod and engaging said member to limit the forward movement of the indicator and restore the same to normal position, substantially as described.

5. In a weighing scale, an indicator, a weight-actuated rack geared to said indicator, a weighing mechanism having a vertically movable rod, a stop arm pivoted on said rod and engaging said rack, and an adjusting screw and counterweight for holding said stop arm in a substantially horizontal position, substantially as described.

6. In a weighing scale, an indicator, a releasable latch for holding said indicator in normal position, a vertically movable rack geared to said indicator, a vertically movable weight actuated rod, a stop arm pivoted in said rod and having an offset engaging said rack, and a stop device and counterweight for holding said stop arm in a substantially horizontal position.

7. In a weighing scale, a weight-actuated member, a weight indicator and a counterweighted stop device positioned by said weight-actuated member for arresting the forward movement of the weight indicator.

8. In a weighing scale, an indicator, a weighing mechanism, and means positioned by said weighing mechanism for arresting the forward movement of said indicator and comprising a pivoted counterweighted stop arm.

9. In a weighing scale, a weight indicator, a weight-actuated member, and means for arresting the forward movement of said indicator comprising a counterbalanced arm pivoted on said member.

10. In a weighing scale, a weight-actuated member, an indicator, means for arresting the forward movement of said indicator comprising a stop arm pivoted on said weight-actuated member, and a counterweight and stop device for holding said stop arm in a substantially horizontal position.

11. In a weighing scale, a vertically movable, weight-actuated member, a stop arm pivoted on said member for arresting the forward movement of said indicator and a counterweight and an adjustable screw for normally holding said stop arm in a substantially horizontal position.

12. In a weighing scale, a weight indicator, a gravity-actuated member for moving said indicator in forward direction, a vertically movable, weight-actuated member and a counterbalanced stop arm pivoted on said member for limiting the forward movement of the indicator and restoring the same to normal position.

THOMAS W. B. WATLING.